United States Patent
Cheah

(10) Patent No.: US 10,479,019 B2
(45) Date of Patent: Nov. 19, 2019

(54) METHOD OF FORMING A TEXTURED EFFECT ON A SUBSTRATE

(71) Applicant: NEOLT ASIA PTE LTD, Singapore (SG)

(72) Inventor: Kok Leong Cheah, Singapore (SG)

(73) Assignee: NEOLT ASIA PTE LTD, Singapore (SG)

(*) Notice: Subject to any disclaimer, the term of this patent is extended or adjusted under 35 U.S.C. 154(b) by 0 days.

(21) Appl. No.: 15/765,482

(22) PCT Filed: Oct. 1, 2015

(86) PCT No.: PCT/SG2015/050360
§ 371 (c)(1),
(2) Date: Apr. 2, 2018

(87) PCT Pub. No.: WO2017/058102
PCT Pub. Date: Apr. 6, 2017

(65) Prior Publication Data
US 2019/0070784 A1    Mar. 7, 2019

(51) Int. Cl.
*B29C 64/393* (2017.01)
*B33Y 10/00* (2015.01)
(Continued)

(52) U.S. Cl.
CPC ............ *B29C 64/393* (2017.08); *B29C 41/36* (2013.01); *B29C 64/112* (2017.08); *B29C 67/00* (2013.01);
(Continued)

(58) Field of Classification Search
CPC ...... C09D 4/00; C09D 11/101; C09D 11/322; C09D 11/38; C09D 7/61; G06F 3/1204;
(Continued)

(56) References Cited

U.S. PATENT DOCUMENTS 3,931,429 A       1/1976   Austin
6,661,835 B1 *  12/2003   Sugimoto .......... H04B 1/71075
                                                                 375/144
(Continued)

FOREIGN PATENT DOCUMENTS

JP    2007-051244 A    3/2007
JP    2008-188826 A    8/2008
(Continued)

OTHER PUBLICATIONS

Foreign Correspondence From a Related Counterpart Application, International Search Report and Written Opinion dated Jan. 12, 2015, International Application No. PCT/SG2015/050360 filed on Oct. 1, 2015.
(Continued)

*Primary Examiner* — Negussie Worku

(57) ABSTRACT

A method of forming a textured effect on a substrate, the method comprising steps of: (a) creating a data file of an image having a thickness to be formed as the textured effect on the substrate, the data file comprising print image(s) and a number of times specified for printing of the print image(s); (b) preparing the data file for surface deposition by a printer; (c) providing the substrate on the printer; (d) the printer printing the print image(s) in the data file on the substrate using a layer of clear ink; (e) the printer UV curing the layer of ink; (f) repeating steps (d) and (e) for every print image of the print image(s) for the number of times specified in the data file such that the image formed as the textured effect on the substrate comprises a plurality of layers of printed and UV cured clear ink.

9 Claims, 2 Drawing Sheets

(51) Int. Cl.
  *B29C 64/112* (2017.01)
  *B41M 3/16* (2006.01)
  *B29C 67/00* (2017.01)
  *B41M 7/00* (2006.01)
  *B29C 41/36* (2006.01)

(52) U.S. Cl.
  CPC ........... *B33Y 10/00* (2014.12); *B41M 7/0081* (2013.01); *B41M 3/16* (2013.01)

(58) Field of Classification Search
  CPC ...... G06F 3/1205; G06F 3/126; G06F 3/1275; G06F 3/1282; G06Q 10/0631; B29C 41/36; B29C 64/112; B29C 64/393; B29C 67/00; B33Y 10/00; B41M 3/16; B41M 7/0081
  USPC ....................................................... 358/1.15
  See application file for complete search history.

(56) References Cited

U.S. PATENT DOCUMENTS

| | | | |
|---|---|---|---|
| 2002/0167101 A1 | 11/2002 | Tochimoto | |
| 2005/0042429 A1 | 2/2005 | Longobardi | |
| 2005/0106393 A1 | 5/2005 | Schaeffeler | |
| 2013/0127960 A1* | 5/2013 | Edwards | B41J 2/2114 347/102 |
| 2014/0044894 A1 | 2/2014 | Shipway | |
| 2014/0085665 A1* | 3/2014 | Sheldon | G06Q 10/0631 358/1.15 |
| 2014/0363634 A1 | 12/2014 | Morito et al. | |
| 2015/0210010 A1 | 7/2015 | Napadensky | |
| 2016/0024639 A1* | 1/2016 | Cheah | C23C 14/081 216/95 |
| 2016/0250807 A1* | 9/2016 | Atwood | B33Y 10/00 264/401 |
| 2017/0090082 A1* | 3/2017 | Cheah | G02B 1/14 |
| 2017/0107388 A1* | 4/2017 | Wang | C09D 7/61 |

FOREIGN PATENT DOCUMENTS

| | | |
|---|---|---|
| JP | 2011-104875 A | 6/2011 |
| JP | 2014-117833 A | 6/2014 |
| WO | 2005101300 A2 | 10/2005 |
| WO | 2015132734 A1 | 9/2015 |
| WO | 2017058102 A1 | 4/2017 |

OTHER PUBLICATIONS

Foreign Communication from a Related Counterpart Application, European Search Report and Search Opinion dated Jun. 5, 2019, European Application No. 15905529.2 filed on Oct. 1, 2015.
TW Office Action dated Nov. 9, 2018, Taiwan Application Serial No. 105131908; filed on Oct. 3, 2016.
CN Office Action dated Mar. 20, 2019, Chinese Application Serial No. 201580084005.X; filed on Oct. 1, 2015.

* cited by examiner

METHOD OF FORMING A TEXTURED EFFECT ON A SUBSTRATE

CROSS REFERENCE TO RELATED APPLICATIONS

The present application is a filing under 35 U.S.C. 371 as the National Stage of International Application No. PCT/SG2015/050360, filed Oct. 1, 2015, entitled "METHOD OF FORMING A TEXTURED EFFECT ON A SUBSTRATE," which is incorporated herein by reference in its entirety for all purposes.

FIELD OF THE INVENTION

This invention relates to a method of forming a textured effect on a substrate.

BACKGROUND OF THE INVENTION

Textured glass is traditionally formed, whether by hand or mass production, by heating a sheet of glass to temperatures of up 1000° C. or higher and compressing the heated glass sheet between a mould having a textured surface thereon. In this way, texture on the textured surface is transferred to the heated glass sheet. Conventional textured glass is typically 3 to 4 mm thick and the maximum thickness is typically 12 mm, subject to complexity of the design. Appreciably, this process is extremely energy and time consuming due to the high temperatures and pressures involved. Resolution of the applied texture is also limited due to limited conformability of the heated glass sheet to take the shape of the mould, resulting in fine details being unable to be transferred or retained by the glass sheet. Reproducibility or consistency between multiple textured glass sheets is also lacking as textured glass is often handmade, resulting in variations arising between each textured glass sheet that is formed. Colour consistency is also an issue due to colours like red being affected by the curing process when applied to glass.

In other processes to create a textured and/or coloured effect on glass, ceramic frit ink may be screen printed, roller coated onto a sheet of glass, or spray painted and fused onto the surface using a toughening or heat strengthening process. However, such processes also involve high energy due to the high temperature involved in the curing process. Furthermore, resolution of the coloured effect using such processes can typically reach only 360×360 dpi at best by using digital ceramic frit printing.

Appreciably, the currently available methods to produce a textured effect on glass as mentioned above are laborious, costly and time consuming, while being able to produce only limited variations in design as well as limited thickness of the glass. The current methods are also unable to match the direction of market trend that is moving towards personalisation of designs.

SUMMARY OF INVENTION

According to a first aspect, there is provided a method of forming a textured effect on a substrate, the method comprising the steps of:
  a) creating a data file of an image having a thickness to be formed as the textured effect on the substrate, the data file comprising at least one print image and a number of times specified for printing of the at least one print image;
  b) preparing the data file for surface deposition by a printer;
  c) providing the substrate on the printer;
  d) the printer printing the at least one print image in the data file on the substrate using a clear ink to form a layer of ink;
  e) the printer UV curing the layer of ink;
  f) repeating steps (d) and (e) for every print image of the at least one print image for the number of times specified in the data file such that the image formed as the textured effect on the substrate comprises a plurality of layers of printed and UV cured clear ink.

Creating the data file may comprise high resolution 3D scanning of an existing image to obtain the at least one print image.

Creating the data file may comprise an artist creating the at least one print image.

Ink density of the clear ink in step (d) may be greater than ink density in current commercial inkjet printing jobs.

Ink density of the clear ink in step (d) may be five times that of the ink density in current commercial inkjet printing jobs.

The method may further comprise printing a coloured image on the substrate.

Printing the coloured image may be performed before step (d).

The coloured image may comprise at least two portions and printing the coloured image may comprise printing a first of the at least two portions after printing and UV curing a first layer of clear ink; and printing a second of the at least two portions after printing and UV curing a second layer of clear ink.

The at least one print image may comprise a plurality of distinct print images corresponding to layers of the image at distinct intervals of displacement along the thickness of the image.

The method may further comprise providing a decorative addition on the substrate and printing over the decorative addition with the clear ink such that the decorative addition is encapsulated within the plurality of layers of printed and UV cured clear ink.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawing.

DETAILED DESCRIPTION

Exemplary embodiments of a method 10 of forming a textured effect on a substrate will be described below with reference to FIGS. 1 to 4.

Figure 1:
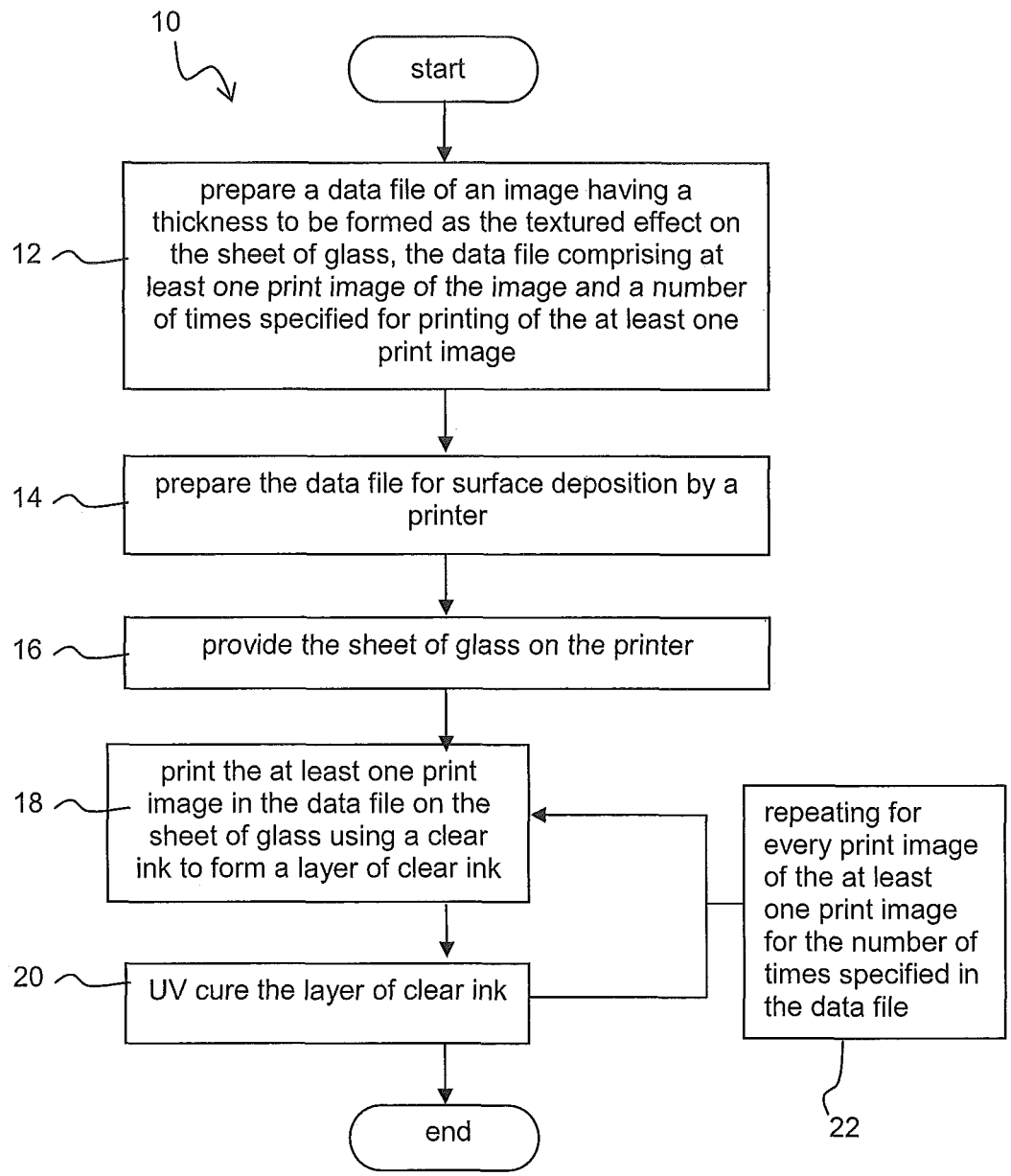
FIG. 1 is a flow chart of an exemplary method of the present invention.

As shown in FIG. 1, the method 10 comprises first creating a data file containing data of an image to be formed as a textured effect 12 on a substrate, such as a sheet of glass. The data comprises at least one print image as well as a number of times that each print image should be printed in order to completely form the image as a textured effect on the sheet of glass. The data file is prepared for printing 14 and sent to a suitable printer. The sheet of glass 16 is provided on the printer, followed by printing the at least one print image on the sheet of glass using a clear ink 18 and UV curing of the printed clear ink 20 for the number of times specified in the data file. The final textured effect formed on the sheet of glass comprises a plurality of layers of printed and cured ink corresponding to the at least one print image in the data file. The method 10 will be described in greater detail below.

Depending on the image to be formed as the textured effect 12, the data file may contain only one print image or a plurality of distinct print images. For example, if the image to be formed as a textured effect varies in contour at different displacements along a thickness of the image, a plurality of distinct print images is required to form the image as a textured effect in which each of the plurality of print images is a cross-section of the image at intervals of displacement along the thickness of the image. The plurality of distinct print images are in parallel planes to one another.

In another example, if the image to be formed as a textured effect does not have contour variations along its thickness, a single print image may suffice in which printing the single print image multiple times on top of each preceding printed and UV cured clear ink layer results in the image being formed as a textured effect on the sheet of glass.

In a preferred embodiment, where a plurality of print images are required to form the image, the interval of displacement between adjacent print images is 0.05 mm, and the image has a maximum thickness of 50 mm after printing. Thus, for an image with varying contours at different displacements along its thickness and a maximum thickness of 5 mm, the preferred embodiment of the data file contains 100 distinct print images wherein each print image is taken at intervals of 0.05 mm along the entire thickness of the image. Alternatively, the data file may contain 50 distinct print images taken at intervals of 0.1 mm along the entire thickness of the image. It should be noted that an image having a thickness of up to 50 mm may be formed as a textured effect on a sheet of glass using a data file containing 1000 print images taken at intervals of 0.05 mm along the entire thickness of the image.

The data file may be created by scanning an existing image using a high resolution 3D scanner to obtain the at least one print image. An example of such a high resolution 3D scanner is a METIS DC SynchroLight scanner. In a preferred embodiment, each print image obtained by the 3D scanner is saved as an image file, such as a TIFF (Tagged Image Format File), EPS (Encapsulated PostScript) or PDF (Portable Document File) file. For an image requiring a plurality of print images to be formed, a plurality of image files obtained by the 3D scanner of cross-sections of the image at intervals along the thickness of the image thus form the data file of the image.

Alternatively, the data file may be created by an artist using a graphical editing software such as Adobe on a computer to create the at least one print image or plurality of distinct print images as may be required.

The data file comprising the at least one print image is subsequently prepared for surface deposition or 2.5D printing 14 by a suitable printer, such as a flatbed digital inkjet printer. Preparation may be performed by a raster image processor (RIP) followed by sending of the prepared data file to the printer.

The printer is provided with a sheet of glass 16 onto which the image is to be formed as a textured effect. In a preferred embodiment, the sheet of glass 16 comprises laminated safety glass. Using the prepared data file, the printer prints each print image in the data file onto the sheet of glass using a clear ink 18, such as a suitable clear varnish, followed by UV curing of each printed print image 20, for the number of times specified in the data file.

Printing of each print image comprises the printer propelling droplets of the clear ink onto the sheet of glass. In the present invention, printing density or the density of firing or jetting of the clear ink is greater than current clear ink printing density in current commercial inkjet printing jobs such as spot varnish application. In a preferred embodiment, the ink density of the clear ink in the present invention is about five times that of the density of clear ink used in currently available commercial inkjet printing applications. For example, while currently available commercial printers can print clear ink such as varnish with a thickness of 3 microns or 0.003 mm, the present method using a same ink density can print varnish with a thickness of 0.01 mm. At an ink density of 500% (5 times) that of commercial varnish printing, the present method can print varnish with 0.05 mm thickness in gradient while at ink density of 600% (6 times), the present method can print varnish with thickness of 0.06 mm without gradient.

Figure 2:
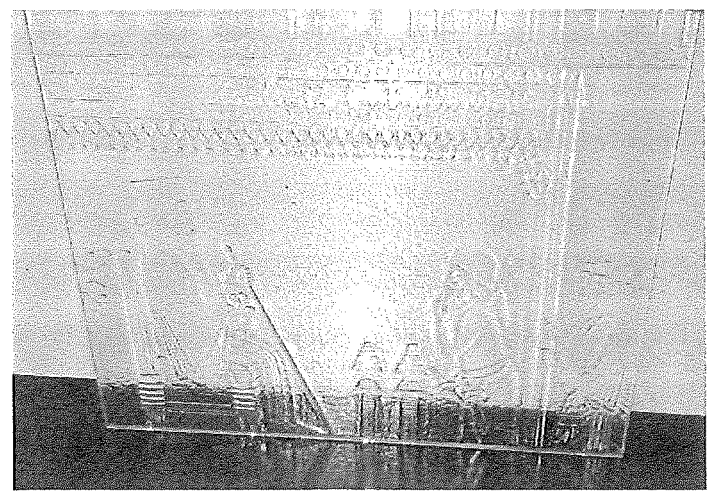
FIG. 2 is an exemplary textured effect formed on glass using the method of the present invention.

The image formed as a textured effect on the sheet of glass thus comprises a plurality of layers of clear ink that have been printed and UV cured one on top of the other. During the printing process, the total thickness of ink that has been printed will be a percentage of the data in the data file that has been printed. For example, if each layer of ink that is printed is 0.05 mm thick and the data file has an image that is to be 5 mm thick upon completion of printing, 1% of the data file printed means a printed ink thickness of 0.05 mm, 50% of the data file printed means a printed ink thickness of 2.5 mm, and 100% of the data file printed means a printed ink thickness of 5 mm. An example of such a textured effect formed on glass is shown in FIG. 2.

An example of the clear ink that may be used in the present method is JETI VARNISH by AGFA, while an exemplary printer that may be used to print and UV cure the clear ink in the present method is the JETI TITAN S printer by AGFA. The JETI TITAN printer is able to print an image to form a textured effect on a sheet of glass of up to 1.87 m wide×3.09 m long.

Figure 3:
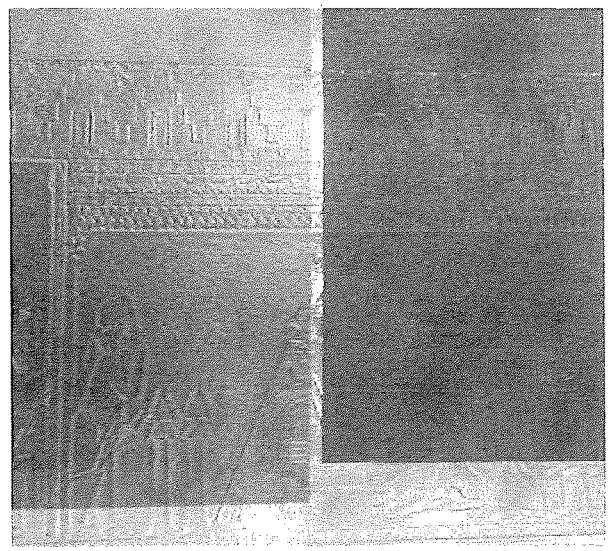
FIG. 3 is an exemplary textured effect formed on glass using the method of the present invention.

In addition to forming the textured effect on a sheet of glass, the present method may also form a coloured effect on the same sheet of glass as shown in FIG. 3 by colour printing of a coloured image that has been created and suitably prepared for printing using the same printer as that for forming the textured effect. In one embodiment, the coloured image is printed on the sheet of glass before printing with clear ink to form the textured effect. Alternatively, printing of the coloured image may be interspersed between printing of each layer of ink as specified in the data file. For example, the coloured image may comprise at least two portions such that a first portion of the coloured image is printed after printing one layer of ink while a second portion of the coloured image is printed after printing another layer of ink.

Figure 4:
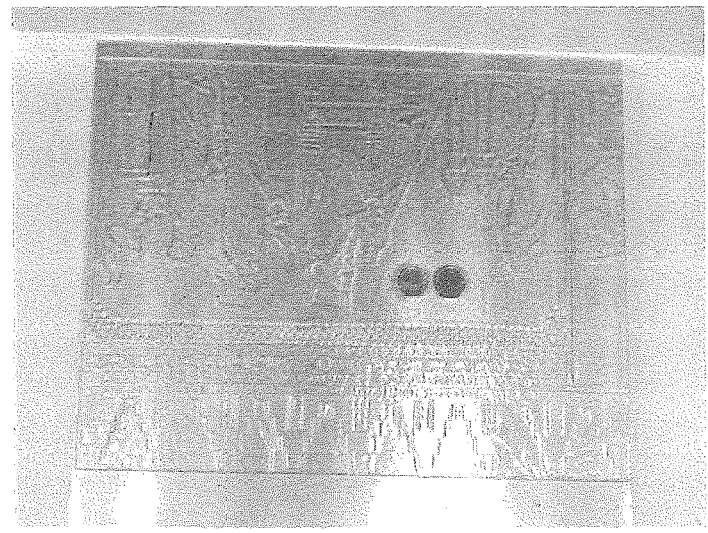
FIG. 4 is an exemplary textured effect formed on glass using the method of the present invention.

Besides addition of colour to the textured effect, one or more decorative additions such as LEDs connected with conductive ink, crystals and so on may also be included during the printing process of the present method by providing the decorative addition on the sheet of glass and printing over the decorative addition with the clear ink so that the layers of printed and UV cured clear ink serve as an encapsulant for the decorative addition, as well as a decorative textured effect, as shown in FIG. 4. The one or more decorative addition may be placed on the sheet of glass directly before printing of any clear ink, or the decorative addition may be included after at least one layer of clear ink has been printed. Notably, where conductive ink is printed as an electrical trace between layers of printed clear ink, the conductive ink may be further printed over with coloured ink to aesthetically incorporate the electrical trace into the overall finished design of the textured effect formed on the glass.

Using the above described method, large sheets of substrate such as glass of up to 2.69 m×3.2 m in size may be reproducibly printed with clear ink to form a textured effect on each sheet of the glass with excellent repeatability, with any further decorative additions as may be desired, without requiring any high temperature or high pressure processes to be applied to the glass so as not to consume more energy that adds to global warming. Any conceivable design may be formed as a textured effect on glass using the present method, by creating the data file accordingly. Using the present invention, consistent, personalized textured designs on glass can be mass produced on a commercial or industrial scale at significantly lowered cost and time compared to using traditional textured glass production methods, while providing great flexibility in formation of the textured effect in any desired design with any desired colour and/or decorative additions. Furthermore, the thickness of the textured glass formed can be 50 mm or more including the textured effect comprising the layers of printed and UV cured clear ink, resulting in a stronger and safer product.

Whilst there has been described in the foregoing description exemplary embodiments of the present invention, it will be understood by those skilled in the technology concerned that many variations in details of design, construction and/or operation may be made without departing from the present invention. For example, while it has been described above that the substrate may be a sheet of glass, the substrate may alternative be made of any other material or materials such as metal, plastic, paper, wood and so an. While it has been described that the data file is prepared for printing via an RIP, in alternative embodiments, it is possible to convert Gcode files into a printable file format using a 3D design software such as AutoCAD that is understandable from RIP. While it has been described above that a suitable printer may be a flatbed digital inkjet printer, it will be understood that other printers such as a 3D printer may be used if appropriately configured, and both single pass printing or scan printing may be used upon appropriate configuration of the printer.

The invention claimed is:

1. A method of forming a textured effect on a sheet of glass, the method comprising the steps of:
    a) creating a data file of an image to be formed as the textured effect on the sheet of glass, the data file comprising at least one print image and a number of times specified for printing of the at least one print image;
    b) preparing the data file for surface deposition by a printer;
    c) providing the sheet of glass on the printer;
    d) printing, with the printer, the at least one print image in the data file on the sheet of glass using a clear ink to form a layer of ink;
    e) UV curing, with the printer, the layer of ink;
    f) repeating steps (d) and (e) for every print image of the at least one print image for the number of times specified in the data file so that the image formed as the textured effect on the sheet of glass comprises a plurality of layers of printed and UV cured clear ink.

2. The method of claim 1, wherein creating the data file comprises high resolution 3D scanning of an existing image to obtain the at least one print image.

3. The method of claim 1, wherein creating the data file comprises an artist creating the at least one print image.

4. The method of claim 1, wherein ink density of the clear ink results in the layer of ink in step (d) having a thickness of at least 0.05 mm.

5. The method of claim 1, further comprising printing a coloured image on the sheet of glass.

6. The method of claim 5, wherein printing the coloured image is performed before step (d).

7. The method of claim 5, wherein the coloured image comprises at least two portions and printing the coloured image comprises:
    printing a first of the at least two portions after printing and UV curing a first layer of clear ink; and
    printing a second of the at least two portions after printing and UV curing a second layer of clear ink.

8. The method of claim 1, wherein the at least one print image comprises a plurality of distinct print images corresponding to layers of the image at distinct intervals of displacement along a thickness of the image.

9. The method of claim 1, further comprising providing a decorative addition on the sheet of glass and printing over the decorative addition with the clear ink such that the decorative addition is encapsulated within the plurality of layers of printed and UV cured clear ink.

* * * * *